(12) United States Patent
Novick et al.

(10) Patent No.: US 7,126,705 B1
(45) Date of Patent: Oct. 24, 2006

(54) METHOD AND APPARATUS FOR REMOTE PRINTING

(75) Inventors: A. Stephen Novick, Newark, DE (US); William J. Hulsman, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/384,147

(22) Filed: Aug. 27, 1999

(51) Int. Cl.
*G06F 3/12* (2006.01)

(52) U.S. Cl. .................. 358/1.15; 358/504
(58) Field of Classification Search .......... 358/1.15, 358/504, 406, 1.18, 1.16; 709/203, 210, 709/220

See application file for complete search history.

(56) References Cited

U.S. PATENT DOCUMENTS

| | | | |
|---|---|---|---|
| 4,955,290 A * | 9/1990 | Kipphan et al. ............ 101/183 |
| 5,060,013 A | 10/1991 | Spence |
| 5,107,332 A | 4/1992 | Chan .......................... 358/80 |
| 5,323,249 A | 6/1994 | Liang ......................... 358/518 |
| 5,369,261 A | 11/1994 | Shamir |
| 5,416,613 A | 5/1995 | Rolleston et al. ........... 358/518 |
| 5,491,568 A | 2/1996 | Wan ............................ 358/518 |
| 5,537,516 A * | 7/1996 | Sherman et al. ............ 358/1.9 |
| 5,594,557 A | 1/1997 | Rolleston et al. ........... 358/518 |
| 5,689,350 A | 11/1997 | Rolleston ................... 358/504 |
| 5,693,440 A | 12/1997 | Barbur et al. ............... 430/330 |
| 5,760,913 A | 6/1998 | Falk ............................ 358/298 |
| 5,786,908 A | 7/1998 | Liang ......................... 358/518 |
| 5,786,994 A | 7/1998 | Friz et al. |
| 5,818,960 A | 10/1998 | Gregory, Jr. et al. ....... 382/167 |
| 5,848,346 A | 12/1998 | Takashiro |
| 5,920,358 A | 7/1999 | Takemura .................. 348/655 |
| 6,043,909 A | 3/2000 | Holub |
| 6,048,117 A | 4/2000 | Banton |
| 6,141,120 A * | 10/2000 | Falk ........................... 358/504 |
| 6,157,735 A | 12/2000 | Holub |
| 6,327,047 B1 * | 12/2001 | Motamed .................. 358/1.15 |
| 6,337,922 B1 * | 1/2002 | Kumada .................... 382/162 |
| 6,404,511 B1 * | 6/2002 | Lin et al. .................... 358/1.9 |
| 6,404,517 B1 * | 6/2002 | Chao .......................... 358/504 |
| 6,430,711 B1 * | 8/2002 | Sekizawa .................... 714/47 |

FOREIGN PATENT DOCUMENTS

EP   0 606 131 B1   1/2003

* cited by examiner

*Primary Examiner*—Dov Popovici
(74) *Attorney, Agent, or Firm*—Thomas H. Magee

(57) ABSTRACT

A remote printing system including a communication port, a printing device, and a measuring device. The printing device prints images received from the communication port, and the measuring device generates image measurement information from the printed image and transmits the image measurement information to the network port. The remote printing system preferably includes an image server located remotely from the printing device and the measuring device. The image server preferably transmits image data to the printing device, whereupon it is printed, and the measuring device then generates and transmits image measurement information back to the image server. The image server may then generate print quality information. Alternatively, the remote printing system includes a computer collocated with the printing device and measuring device. The computer obtains the image source information from the image server and relays it to the printing device. The measuring device generates and transmits image measurement information to the computer. The computer may then determine the print quality locally, without the need to relay the image measurement information back to the image server. Preferably, the computer relays a message regarding the print quality back to the image server.

28 Claims, 7 Drawing Sheets

METHOD AND APPARATUS FOR REMOTE PRINTING

BACKGROUND OF THE INVENTION

A. Field of the Invention

The present invention relates to printing facilities. More specifically, it is directed to a method and device for printing.

B. Description of the Related Art

Printing systems typically do not provide a way of automatically verifying the color fidelity of the printed images. Manual verification is often performed using a proofing strip containing a test pattern that is compared to a reference. Often this comparison is done visually by the operator or the system, such as a graphic artist or other publishing and printing professionals. In modern printing systems, there is an increasing use of multi-color documents. In particular, in the printing and publishing industry, the color quality provided to the end user is important as an element in determining adequate performance under an agreement. As such, verification of color quality can have significant ramifications upon a printing business operation.

With the interconnection of computers on a global scale, more and more image information is being transmitted over interconnected computing devices using presently available communication networks. However, due to numerous color output technologies and formats, and different output device characteristics, the color reproduction of the original cannot be guaranteed. This presents a significant barrier to the utilization of digital image transmission as a mechanism for providing image source information for printing at another location.

Thus, there exists a need not only to verify the receipt of image and text information at a remote printing location, but also to verify the color fidelity of the remotely printed images. Therefore, to overcome the disadvantages of the prior art techniques of printing, it is desirable to provide an improved remote printing system and method.

SUMMARY OF THE INVENTION

In accordance with an aspect of the present invention, a remote printing system is provided. The remote printing system allows a user to print an image at a remote location, where the color reproduction quality of the remotely printed image is known to the user. The remote printing system includes a communication port, a printing device, and a measuring device. The printing device prints images received from the communication port, and the measuring device generates color information from the printed image and transmits the color image information to the communication port. The printing device may be a printing press (flexographic, offset, lithographic, gravuer) or proofers. The measuring device may be a spectrophotometer, calorimeter, densimeter, or other suitable measuring device.

The remote printing system preferably includes an image server located remotely from the printing device(s) and the measuring device(s). The image server preferably transmits image data to the printing device, whereupon it is printed, and the measuring device then generates and transmits measured image information back to the image server. This is image verification information from which the image server may then generate print quality information, or otherwise verify the image quality.

In an alternative embodiment, the remote printing system includes a computer collocated with the printing device and measuring device. The computer preferably includes a memory, a processor, and a communication port adapted for connection to a communication medium. The computer obtains the image source information from the image server and relays it to the printing device. The measuring device generates and transmits measured image information to the computer. The computer may then determine the print quality locally, without the need to relay the measured image information back to the image server. Preferably, the computer relays image verification information in the form of a message regarding the print quality back to the image server.

In the alternative embodiments disclosed herein, the image server preferably communicates with the computer, or directly with the printing device and measuring device, over a communication medium. The network may be any suitable network of interconnected computing devices, such as a packet-switched network (e.g., the Internet), or a circuit-switched network (e.g., the public switched telephone network). The network may be publicly accessible or may include a dedicated private network. A network router, hub or other suitable interface may be utilized at the server location and/or at the remote printing location. The use of protocol stacks such as TCP/IP or other suitable protocol is utilized by the computer and/or printing and measuring devices.

In a preferred embodiment, the image source information includes a control image, or control information. The control image is preferably an arrangement of predetermined colors, which may be a color strip or other arrangement, such as a two-dimensional array.

In accordance with yet another aspect of the invention, the control image may also include identification information. While the colors are preferably selected from predetermined colors, their arrangement or sequence within the control image is preferably indicative of a print job number or serial number.

A print quality measurement is preferably obtained by determining the variation between the digital source, or the expected printed image information and the measured image information. Alternatively, the measurement may be obtained by comparing the digital image measurement information to a digital reference. Preferably, the digital reference is the set of predetermined calorimetric values. The digital image measurement information can be resolved into a sequence of predetermined colorimeter values. Thus, identification information as well as quality control information may be obtained from a single measured control image.

In yet a further aspect of the invention, the control image and corresponding image measurements are used to calibrate the remote printer. The calibration update information may involve providing information to update a color space mapping of each colorant channel, or may involve providing information to update the entire printer characteristic function. The measurement information from numerous print jobs may be used to generate the calibration update information.

The advantages of the apparatus and method of the present invention are set forth in part in the description that follows, and in part will be apparent from the description, or may be learned by practice of the present invention. The advantages of the present invention will be attained by the apparatus and methods particularly pointed out in the written description, the drawings, and the appended claims. It is to be understood, however, that both the foregoing summary description and the following detailed description are exemplary and explanatory only, and not restrictive of the present invention, as claimed.

BRIEF DESCRIPTION OF THE DRAWINGS

The accompanying drawings are included to provide a further understanding of the present invention. The drawings illustrate exemplary embodiments of the present invention and together with the description serve to explain the principles of the invention. The objects, features and advantages of the present invention will be more readily appreciated upon reference to the following disclosure when considered in conjunction with the accompanying drawings, in which.

DETAILED DESCRIPTION OF THE PRESENTLY PREFERRED EMBODIMENT(S)

Figure 1:
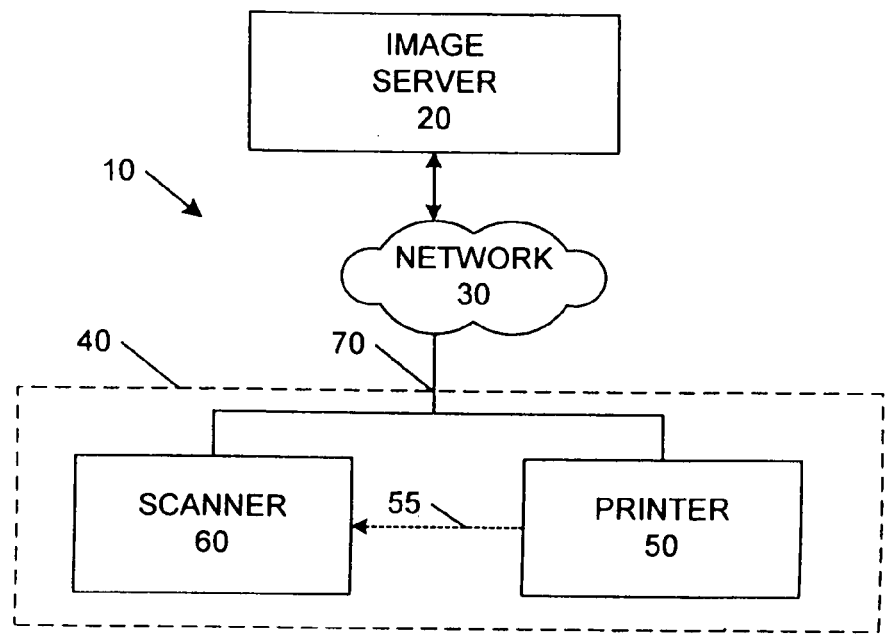
FIG. 1 depicts a block diagram of a preferred embodiment of the remote printing system.

With reference to FIG. 1, a preferred embodiment of the system 10 utilized for remote printing is described. The remote printing system 10 includes a remote printing station 40, which includes a communication port 70, a printing device 50, and a measuring device 60. The printing device 50 prints images received from the communication port 70. The printed image is then supplied to measuring device 60 as shown by line 55. The measuring device 60 generates measurement data, or measurement image information, from the printed image and preferably supplies it to the communication port 70. The measurement information is transmitted via network 30 to an image server 20.

The printing device 50 is preferably a color printer using well-known laser color printing, dye sublimation, or inkjet printing technology. Alternatively, printer 50 may be of the type commonly used in commercial printing applications and devices available from companies such as Heidelberg USA, Inc., 1000 Gutenberg Drive, Kennesaw, Ga. 30144, and Indigo, 5 Limburglaan Ga., Maastricht, Netherlands. Each printing device 50 typically will produce a unique printing of a given image source. Each printer is said to have a color characteristic, or fingerprint. This is also referred to as the printer's color space. Preferably, the image source is specified in a device-independent format, and before printing on a specified printing device 50, the image source is converted to that printer's color space to compensate for its color characteristic. The color-space conversion may be performed by the image server 20, or may be done at the remote printing station 40, or even within the printer 50 itself, thereby allowing printers 50 to accept hardware independent source images.

The remote printing system allows a user at one location to instruct an image to be printed at another location. The system utilizes color transformations to ensure that the color quality of the remotely printed image is within a predefined tolerance range with respect to the image viewed by the user. The user may be viewing a proof image printed locally, or may be viewing the proof on a monitor display. Suitable methods of converting images from one color space to another are disclosed in U.S. Pat. No. 5,786,908, entitled "Method and Apparatus For Converting Image Color Values From a First to a Second Color Space" issued to Liang on Jul. 28, 1998, and assigned to E. I. du Pont de Nemours and Company, which is incorporated herein by reference. The above-referenced conversion system uses a color space converter for converting the image signals into second space color values. Specifically, this system utilizes look up tables (LUTs) and interpolation techniques to transform color information from one color space to another color space to accommodate different device color characteristics. Another method is described in U.S. Pat. No. 5,323,249, entitled "Method for Reproducing Color Images Having One Color Gamut With a Device Having A Different Color Gamut" issued to Liang on Jun. 21, 1994 and also assigned to E. I. du Pont de Nemours and Company, and which is incorporated herein by reference.

These techniques are preferably utilized by the remote computer 80 at the remote printing station to adjust the image information prior to being sent to the remote printer. Alternatively, the image server 20 may implement the color transformation. Preferably, the type of proofing device (e.g., specific printer, or monitor) is taken into account when performing the color transformation, as described in the above references. In the event that a display monitor is used as a proofing device, the techniques described in U.S. Pat. No. 5,920,358, entitled "Method of Transforming Colors of Image" may be utilized, and the contents of which are incorporated herein by reference. The measuring device 60 is preferably a spectrophotometer. In particular, a spectrophotometer such as the DTP41 and DTP22 available from XRite, X-Rite, Incorporated, 3100 44th Street, S.W., Grandville, Mich. 49418, or devices such as the Spectrolino and Spectrascan, available from GretagMacbeth, 617 Little Britain Road, New Windsor, N.Y. 12553, are well suited for use in the remote printing system described herein. Alternatively, measuring device 60 may be a colorimeter, densitometer, or other suitable measuring device.

The remote printing system preferably includes an image server 20 located remotely from the remote printing station 40. The image server 20 is preferably a UNIX-based workstation, but may also be a Windows 95, 98, or NT type server, or may operate using other operating systems such as Linux, IBM OS2, or another similar operating system that may be developed. The image server 20 includes a microprocessor or central processing unit (CPU), a memory storage device, and a communication port (not shown). The image server 20 preferably transmits image data to the remote printing station 40, where it is printed using the printing device 50. The measuring device 60 communicates the measured image information back to the image server 20. The image server 20 may then generate print quality information.

Figure 2:
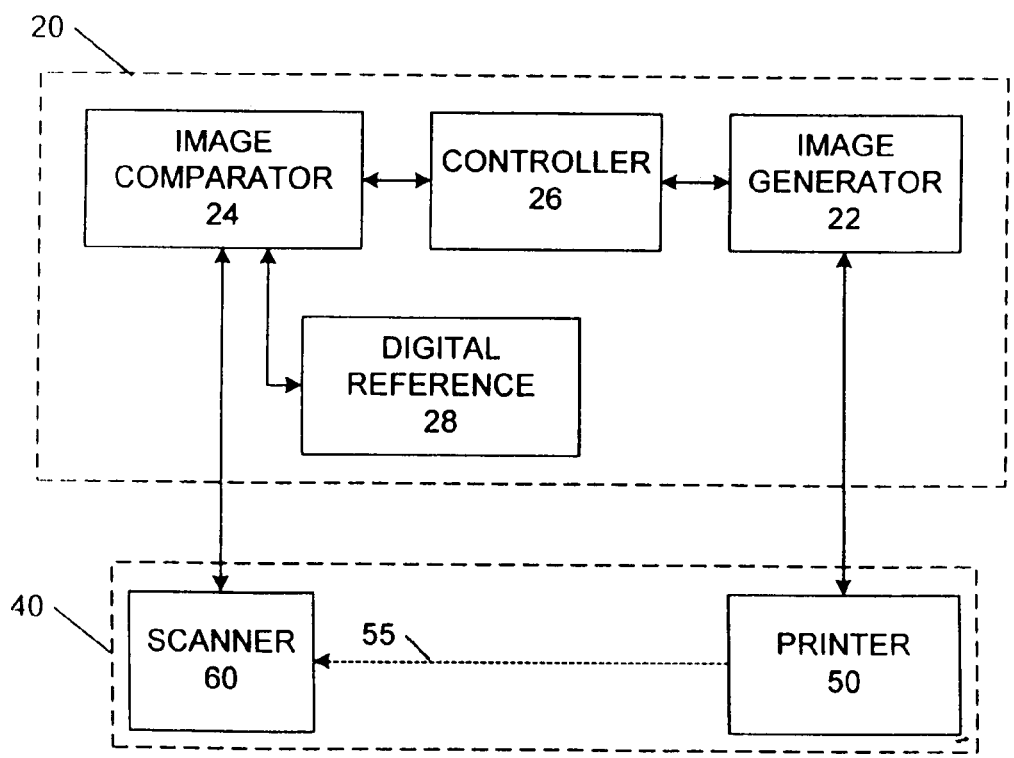
FIG. 2 depicts a block diagram showing further detail of an image server.

With reference to FIG. 2, further details of the image server 20 will be described. The image server 20 preferably includes an image generator 22, a controller 26, and an image comparator 24. Each of these components are preferably software modules stored in the memory (or hard disk), and operating on the central processing unit associated with the image server 20. The image generator 22 provides an image in device-independent format to remote printing station 40. The comparator 24 receives the digital image measurement information from remote printing station 40 and responsively determines the print quality from the measurement information. The image comparator 24 preferably utilizes a digital reference 28 to determine the print quality, as discussed below.

Figure 3:
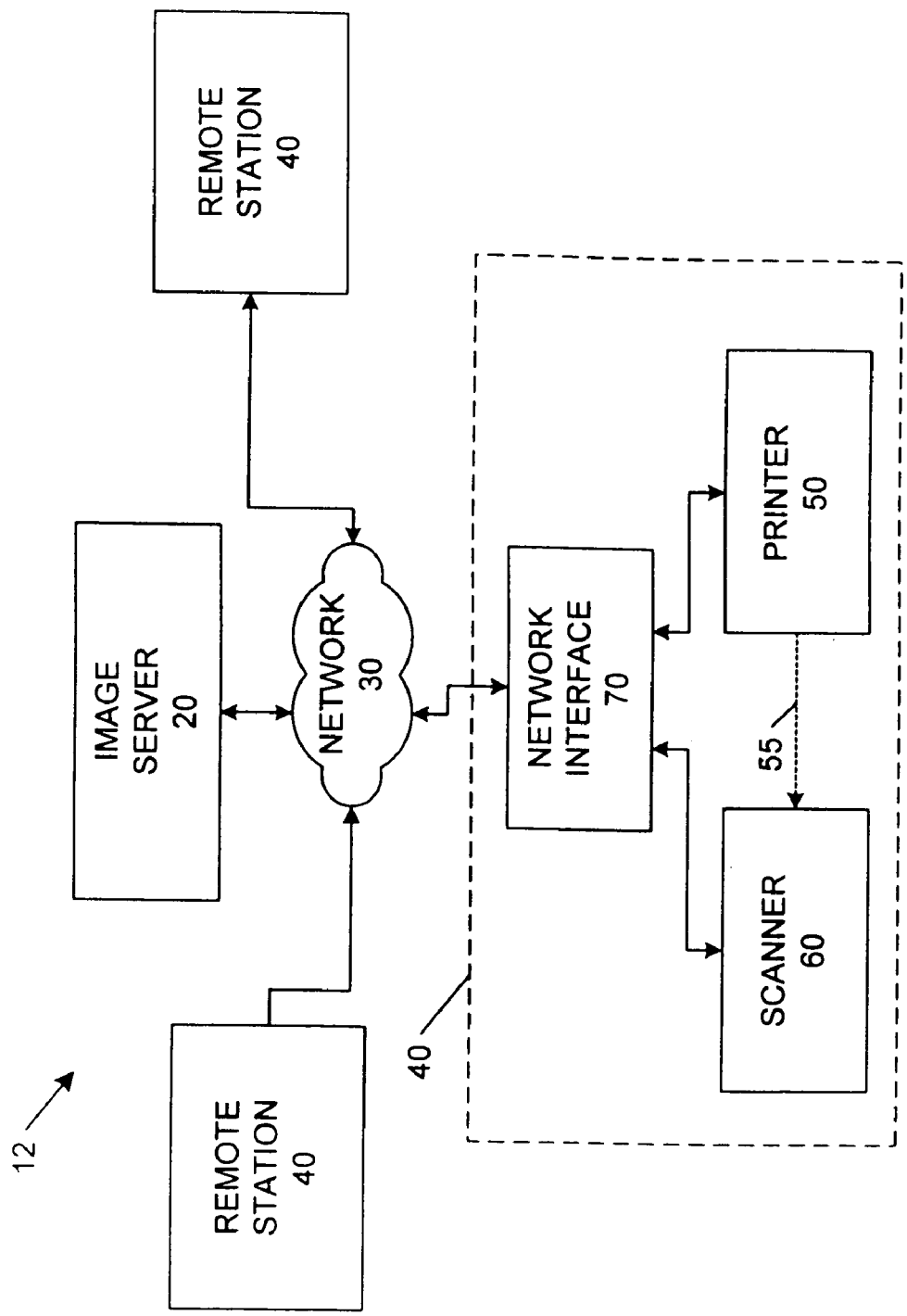
FIG. 3 depicts a block diagram of an alternative embodiment of the remote printing system.

With reference to FIG. 3, it is seen that the remote printing system 12 may include a number of remote printing stations 40. In certain configurations, network interface 70 may be an external router, or hub concentrator, or the like, or other communication device used to facilitate network communication, as is known to those of ordinary skill in the art. Alternatively, each of the measuring devices 60 and printing devices 50 may include their own network interface devices such as an internal network interface card (NIC). Further, each remote printing station 40 may include its own measuring device 60, or a number of remote printing devices 50 may share a single measuring device 60, as shown in FIG. 4.

Figure 4:
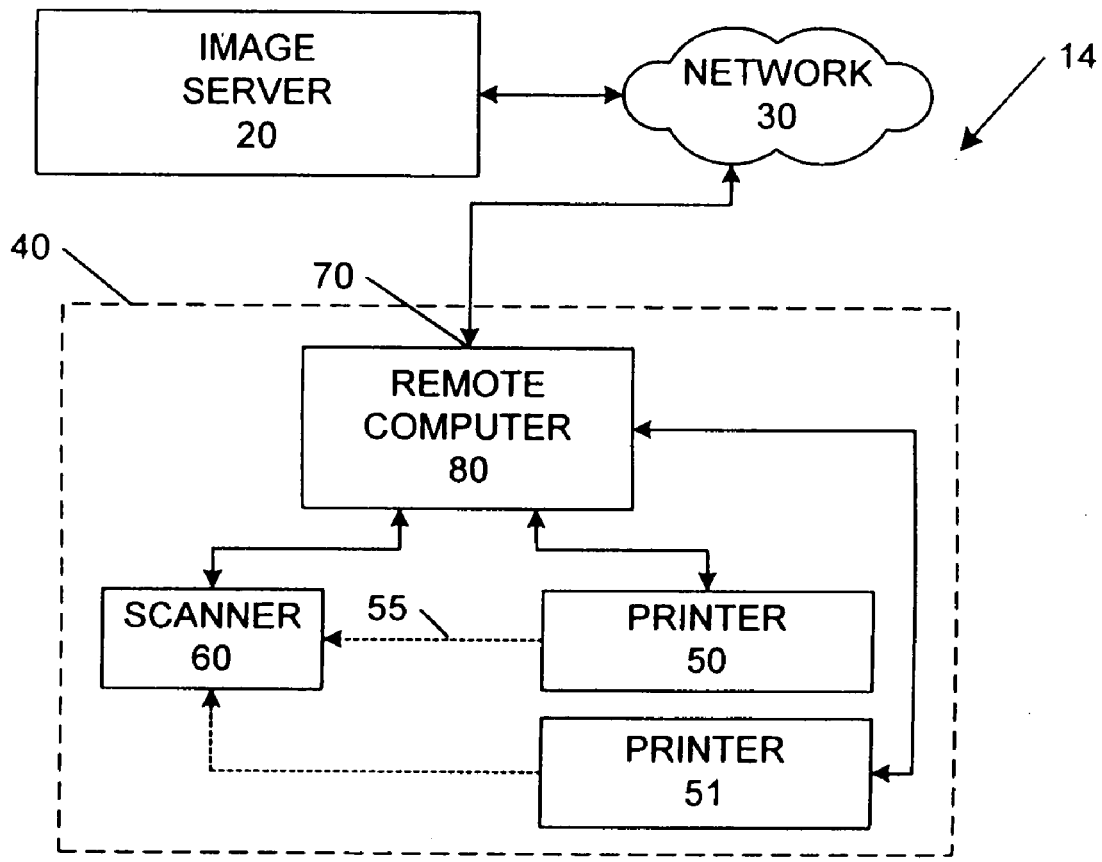
FIG. 4 depicts a block diagram of another alternative embodiment of the remote printing system.

In an alternative embodiment shown in FIG. 4, the remote printing system includes a remote computer 80 collocated with the printing device 50 and measuring device 60. The computer preferably includes a memory, and a processor. The network port 70 associated with the remote computer 80 is preferably an internal network interface card, which is adapted for connection to the communication medium being utilized. The remote computer 80 obtains the image source information from the image server 20 and relays it to one of the printing devices 50.

Figure 5:
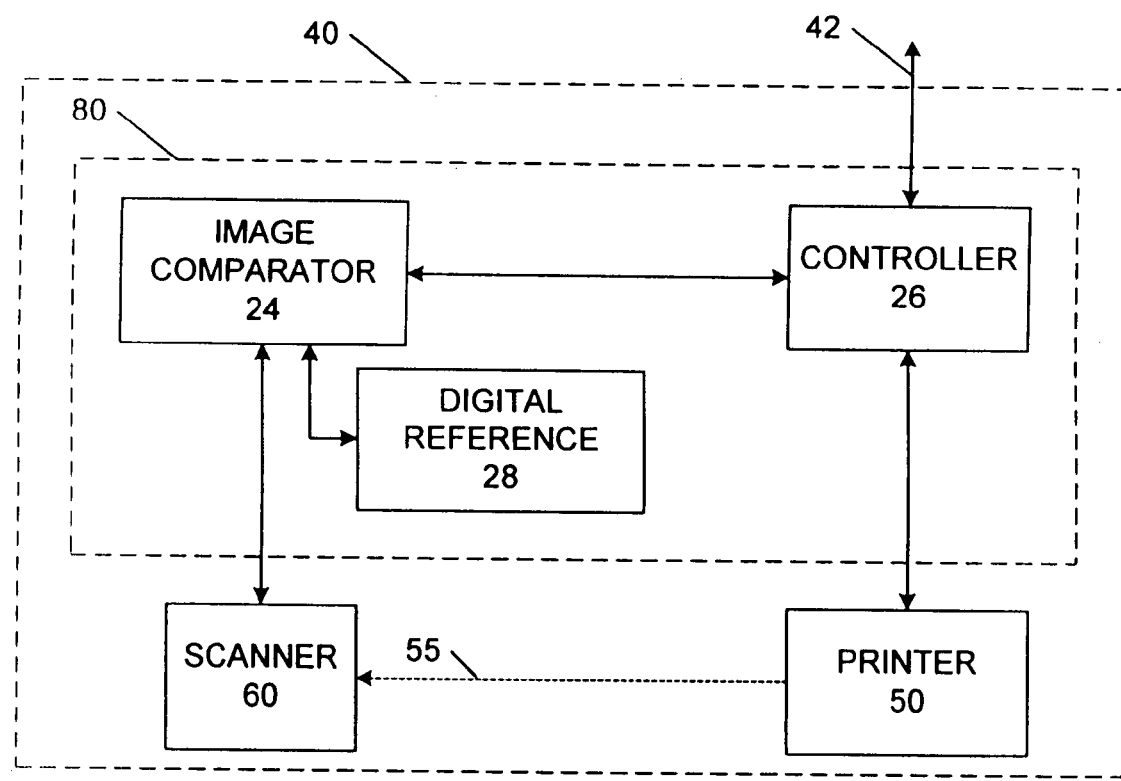
FIG. 5 depicts a block diagram showing further detail of a remote computer.

The measuring device 60 generates and transmits image measurement information to the remote computer 80. The remote computer 80 may then relay the image measurement information back to the image server 20. Of course, the measuring device 60 may relay the image information directly to image server 20 without the need to go through remote computer 80. Alternatively, the remote computer 80 may determine the print quality locally, without the need to relay all of the image information back to the image server 20. In this embodiment, depicted in FIG. 5, the remote computer 80 includes an image comparator 24, and a controller 26. The image comparator 24 may determine print quality from the source information (provided via controller 26), or may utilize a digital reference 28, as discussed below. Preferably, in this embodiment, the remote computer 80 relays a verification message regarding the print quality back to the image server 20. In this way, the users at the image server location will have an indication of image quality. This information may be logged and used to otherwise verify that a desired print quality was attained.

In any of the alternative embodiments described herein, the image server 20 preferably communicates with the remote computer 80, or directly with the printing device 50 and measuring device 60, over a communication medium. The communication medium may be a network using a packet-switched communication format, such as the Internet. In this case, a network router, hub or other suitable interface may be utilized at the image server 20 location and/or at the remote printing location 40. The use of protocol stacks such as TCP/IP or other suitable protocols is utilized by the remote computer 80 and/or printing 50 and measuring devices 60. The communication may also take place over a circuit-switched network such as the public switched telephone network using presently available communication formats such as those set for in ITU Recommendations V.34, V.90. As yet another alternative, a dedicated private network may be used.

In the event that a publicly accessible network is utilized, such as the Internet, the communication stream between the image server and the remote printing station may be encrypted using presently available encryption technology. Preferably, the public key type of encryption is used to facilitate key exchange.

Verifying Image Quality

The comparator 26, whether located within image server 20 or remote computer 80, determines the image quality using the measurement information. The comparator 26 may utilize the control image source provided by image generator 22 (via controller 26) to determine the print quality. Alternatively, the image comparator 24 may utilize a digital reference 28 to determine the print quality. In this embodiment, the image source information preferably includes a control image, or control information. The control image is preferably an arrangement of predetermined colors, which may be a color strip or other arrangement of the predetermined color regions. In a preferred embodiment, the control image is a strip of between 8 and 30 colors arranged in a strip. The control image is printed along the side of the print area. The predetermined colors are preferably determined and specified in a hardware independent color space, and transferred to the printer's 50 color space prior to printing. The comparator 24 may then analyze the digital measured information and determine the nearest predetermined color for each color region. The comparator 26 need not have access to the actual source of the control image information, since only certain predetermined color values are allowed. Thus a digital reference 28 may be used. Of course, the predetermined colors must be far enough apart in color space to permit reliable detection of the colors after noise is added from the printing process (including the color space conversion, printing, and measuring).

The comparator 24 preferably generates an error signal that can take many forms. The error signal may be a vector quantity representing the error of a plurality of points within each color region of the control image, or it may be a vector having one average error per color region, or maybe an overall average error for the entire control image. The error signal can then be compared to a threshold (or thresholds) to determine whether the final print quality is acceptable. Thus, a print quality measurement is obtained by determining the variation between the digital measurement information corresponding to the control image and a digital reference 28.

A number of verification criteria may be used. In one preferred embodiment, none of the measured points differ from the predetermined points by more than a predetermined threshold. In an alternative embodiment; no more than two points have an error above a first threshold and no more than four are outside a second threshold, where the first threshold is lower than the second threshold.

Image Identification

The control image may also include identification information. When the image source information is generated, it is preferably associated with a serial number or job number to provide later identification of the print job. The job number may be encoded into the control image, which is preferably an arrangement of predetermined colors, which may be a color strip or other arrangement of predetermined colors. While the colors are preferably selected from predetermined colors, their arrangement or sequence within the control image is preferably indicative of a print job number or serial number. If each print job is assigned a unique sequence from the set of predetermined colors according to a defined format or algorithm, then any job may be suitably identified as long as the color sequence is correctly resolved to the proper predetermined color. That is to say, the job is identifiable if image comparator 24 decodes the measured control image information without error. Preferably, the set of predetermined colors are chosen such that if the printer is performing within (or near) its specified tolerance level, no errors will occur. Thus, identification information as well as quality control information may be obtained from a single measured control image.

The advantage to having print job identification information embedded in the actual control image is that the measurement device need not have special features to identify the image such as a bar code reader or the like. Neither does the system require operator input to identify the image. The printed image including the control image, when scanned or measured, fully defines the associated print job.

The sequence of colors from a set of N colors may be chosen in a number of ways. In one preferred embodiment, a system of rank ordering is used. The predetermined N colors are chosen to have values that are well spaced apart in the relevant color space, which is preferably the Lab space as specified by the Commission Internationale de l'Eclairage, (CIE), and is well known in the art. Numerical values for chroma and hue are derived from CIE color space parameters a and b. Hue, h, which corresponds to the angle between the color vector and the +a axis is calcuated according to equation (1) below:

$$h = \arctan\left(\frac{b}{a}\right), \quad (1)$$

and chroma, c, which corresponds to the distance between the color locus and the point, is caluculated according to equation (2) below:

$$c = \sqrt{a^2 + b^2}, \quad (2)$$

The third characteristic, brightness, is represented vertically by means of a brightness scale designated L with scale values ranging from 0 (black) to 100 (white).

Each predetermined color is ranked according to its distance from a reference point (or plane, or line—such as the L axis), e.g., 0,0,0 in Lab space, which is black. Then, a given serial number may be represented by the ordering of the N colors according to their rank, using each of the N colors once in each identification sequence.

For example, in an embodiment having only four increasingly bright colors (N=4), represented here for illustration, as the letters A, B, C and D. There are 24 unique permutations of the colors, determined by 4! ("four factorial"), which equals 4×3×2×1=24. Thus, a serial number from 0 to 23 may be represented by a given color sequence. To determine the sequence corresponding to, e.g., the number 11, one first takes the number and divides it by (N−1)!, or 3!. 11÷6=1, (with a remainder of 5). So the first color is the number one rank color of the set (A,B,C,D). In the rank set (A, B, C, D), A has a rank of 0, B has a rank of 1, C a rank of 2, and D a rank of 4. Thus the first color is B.

To determine the second color, the new ranked set of (A,C,D) is used, since B is no longer available, where A has a rank of 0, C has a rank of 1, and D has a rank of 2. The next color is calculated by dividing the remainder 5 (from the previous step) by (N−2)!, or 2!, resulting in 5÷2=2. The next color is therefore D. Similarly, the third color is calculated as C, since 1÷1=1, selected from the set (A, C), and the fourth is A.

Given a color sequence, for example, C,B,D,A, the corresponding number may be determined as follows: first, determine the rank of each color in the given set, and then revise the set to remove that color before determining the rank of the next color in the sequence; next multiply the determined ranks by 3!, 2!, 1!, and 0! And sum the results. In the set (A,B,C,D), C has a rank of 2; in the set (A,B,D), B has a rank of 1; in the set (A,D), D has the rank of 1, and in the set (A), A has the rank of 0. To determine the corresponding number, we have 2×3!+1×2!+1×1!+0×0!=15.

Printer Calibration

The printer 50 may be calibrated when the comparator determines that the printer 50 is outside a specified tolerance. One method of determining when the remote printer is out of tolerance is described above with respect to image verification. If the verification fails, then this may be an indication that a calibration procedure is required. Another method of determining when a remote printer may need calibration is described in U.S. Pat. No. 5,693,440, entitled "Process Verification in Photographic Processes", which is incorporated herein by reference. The method utilizes principal component analysis to generate a combined metric $T^2$. Alternatively, the remote printer may be calibrated periodically, regardless of actual or measured performance.

Prior art techniques may be utilized to calibrate the remote printer, however, many of these techniques are cumbersome and time consuming, and may not be desirable in all circumstances. For example, one technique of calibrating the remote printer involves measuring the points in the color space that make up the LUT entries. The use of LUTs in combination with interpolation techniques (linear, polynomial, spline, etc.) are well known in the relevant art. One disadvantage to this calibration technique is that it may require measurement of numerous points. Such measurements may be obtained, however, by varying from one print job to the next the predetermined colors from which the control image is generated. When all of the measured points are obtained, the calibration update information, in this case new LUT information, may be sent to the remote printer.

As an alternative, the printer's characteristic function may be continually updated using the single-colorant data points obtained from the measured control information from one or more print jobs. This may be implemented, for example, by performing an additional color space transformation as described in U.S. Pat. No. 5,818,960, entitled "Characterization Calibration," the contents of which are incorporated herein by reference. To perform such an update to the printer's characterization function, the control image is preferably made up of predetermined colors selected from one colorant channel at a time.

A further alternative technique of calibrating the remote printer involves measuring a subset of points in the color space that make up the LUT entries and interpolating the remaining LUT entries. The subset of points may be obtained from a single print job, or over more than one print job. Substantially fewer than all of the LUT points need be measured, however. When the subset of measured points are obtained and the remainder have been derived by interpolation techniques, the calibration update information, in the form of revised LUT information, may be sent to the remote printer.

Figure 6:
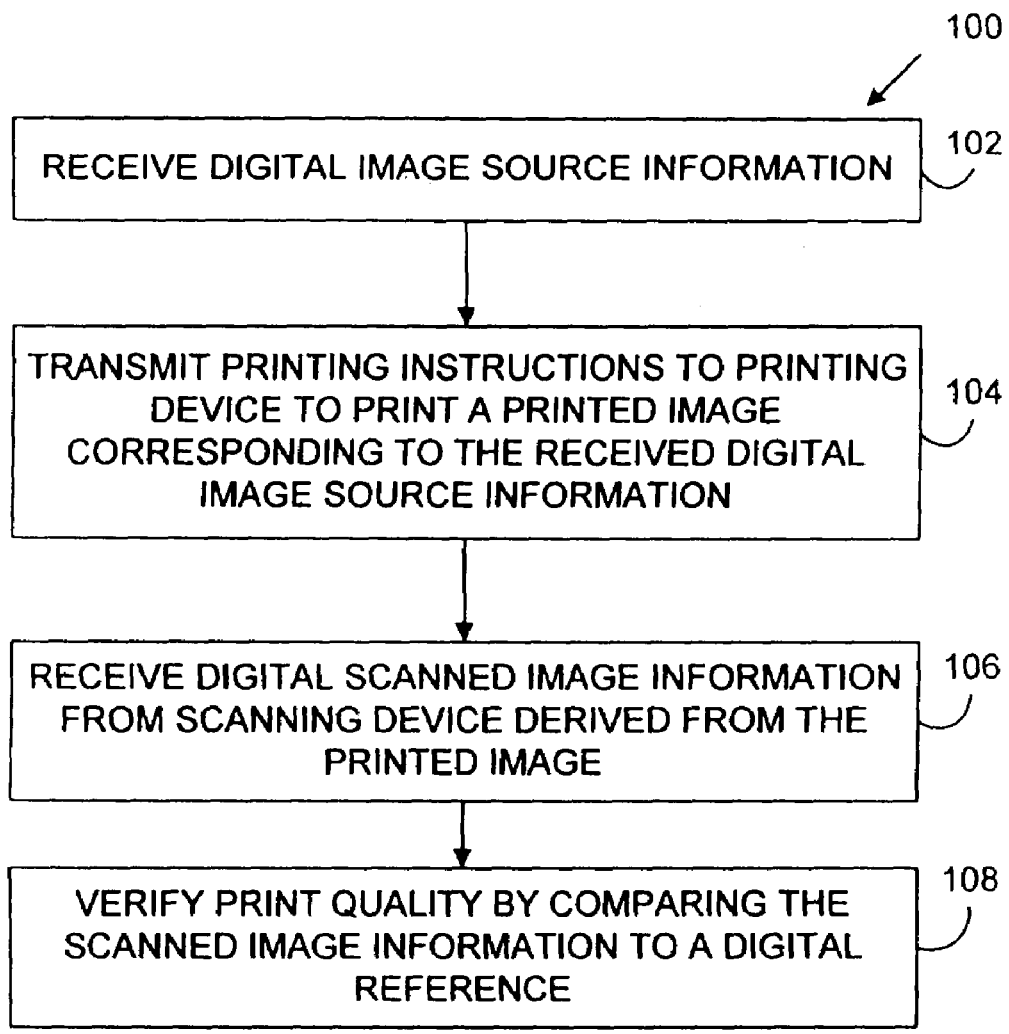
FIG. 6 shows a flowchart depicting a preferred method of remote printing including image quality verification.

With respect to FIG. 6, a preferred method 100 of remote printing will be described. At step 102 the digital image source information is received. Preferably, this image source information is received from image server 20, located separately from the remote printing station 40. The image source information is preferably digital information in a standardized digital image format such as TIFF and IT8. Alternatively, well-known image formats such as GIF, JPEG, etc, may be used. At step 104 the image source information is provided to printer 50, whereupon an image is printed corresponding to the received digital source image information. At step 106, control information is printed. In the preferred embodiments, the measured control information is used to verify print quality, identify a print job and/or calibrate or re-characterize the printer.

The control information is preferably printed as a sequence or arrangement of color regions. The colors within the regions are preferably selected from a set predetermined colors. The colors may be selected so as to use all of the predetermined color values within the set, or may use a subset thereof. The set of predetermined color values are preferably selected so as to be widely spaced in the device-independent color space. A subset of the predetermined colors may be chosen to decrease the size of the printed control information.

For example, in the event that the control information is printed as a control strip of say, fifteen color regions, those fifteen colors may be selected from a set of twenty, fifty, or even one hundred different predetermined colors. From one print job to the next, different colors may be used. In this manner, even though the control image is only fifteen colors, and print quality may still be reliably verified, other advantages are obtained. One such advantage is that more finely spaced data points are available from which to refine or update the printer's characteristic function. Again, the update may be performed incrementally after each print job, or may be done in a batch mode to process data from a number of print jobs, or may done as part of a rigorous calibration procedure performed, e.g., when the printer is determined to be out of tolerance.

When a subset of predetermined colors are used, it is desirable that they remain evenly dispersed throughout the relevant color space. Thus, the overall set of predetermined colors may be grouped into color-space regions, and one point from each region may be selected. Of the course, the regions may be defined as groups of closely-spaced points, or may be sets of interlaced regions. In this way, widely spaced points are guaranteed for each and every print job. In a further alternative embodiment, the subset of colors may be further chosen so as to result in widely spaced colors with respect to the printer's color space.

The digital measurement information is generated at step 108, and at step 210 the print quality is verified. Verification is preferably performed by comparing the measured control information to a digital reference. In this case, the digital reference is simply the set of predetermined colormetric values. The image comparator 24 analyzes each color region within the control information to determine the nearest predetermined colorimetric value point. If the predetermined points are initially selected to be widely spaced, the comparator 24 need not have information about which points were actually chosen and printed. Because of this feature, the control information may also be used to convey identification information.

Figure 7:
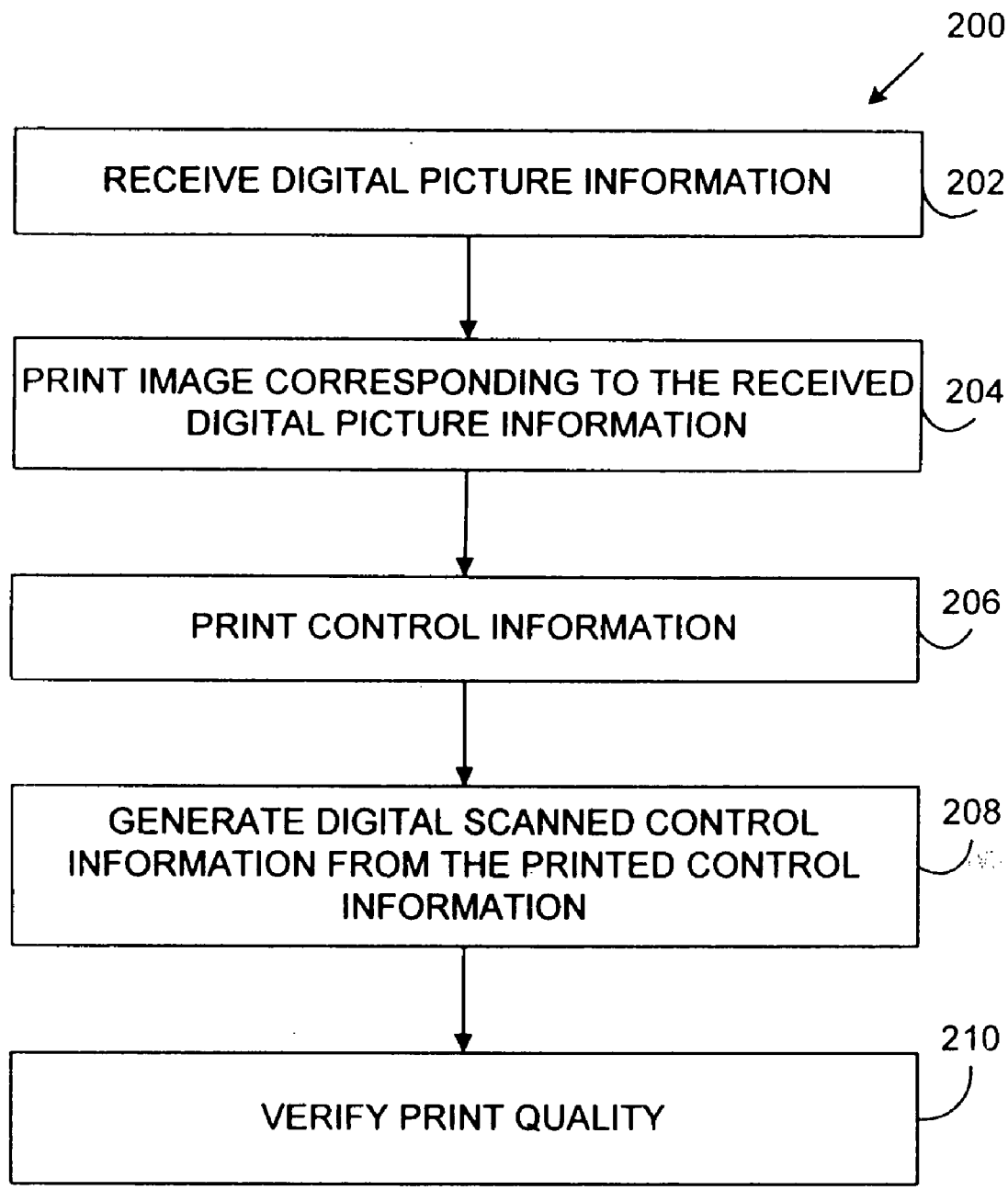
FIG. 7 shows a flowchart depicting an alternative preferred method of remote printing including print job identification; and, FIG. 8 shows a flowchart depicting an alternative preferred method of remote printing including remote printer calibration.

In a further embodiment shown in FIG. 7, the method 200 involves the use of image source information including an image corresponding to a print job number or other file identification information. The identification information may be embedded in the control information in the form of a particular and unique color sequence. The image server 20 may generate and embed this information into the image source, or such a color sequence or arrangement may be generated at the remote printing station 40 from the serial number or other file identification information.

After measuring the control image and receiving the information at step 206, the sequence of colors is determined by comparing the measured control information to the predetermined points. The sequence may also then be used to identify the print job (in addition to providing quality information, as described above). In the event that a subset of points is utilized, the identification may be performed by determining the sequence of color-space regions—that is, each point need not necessarily be identified since its associated region is sufficient. Identification can be performed remotely at the remote printing station 40, or the measured control information may be transmitted back to the image server location for processing and verification.

The identification information may be embedded and recovered using the rank ordering method described above, or an alternative color-mapping scheme. Preferably, the scheme is know to both the remote printing station and the image server, however, the image server need not be involved in the mapping scheme. Specifically, in one preferred embodiment, the image source information is forwarded to the remote printing station along with suitable identification codes or numbers, etc., and the remote printing device generates the color sequence. The remote printing system decodes the measurement information and recovers the identification information at the remote location. It can then also generate a quality measurement and also generate a verification signal such as a verification message sent to the image server.

Figure 8:
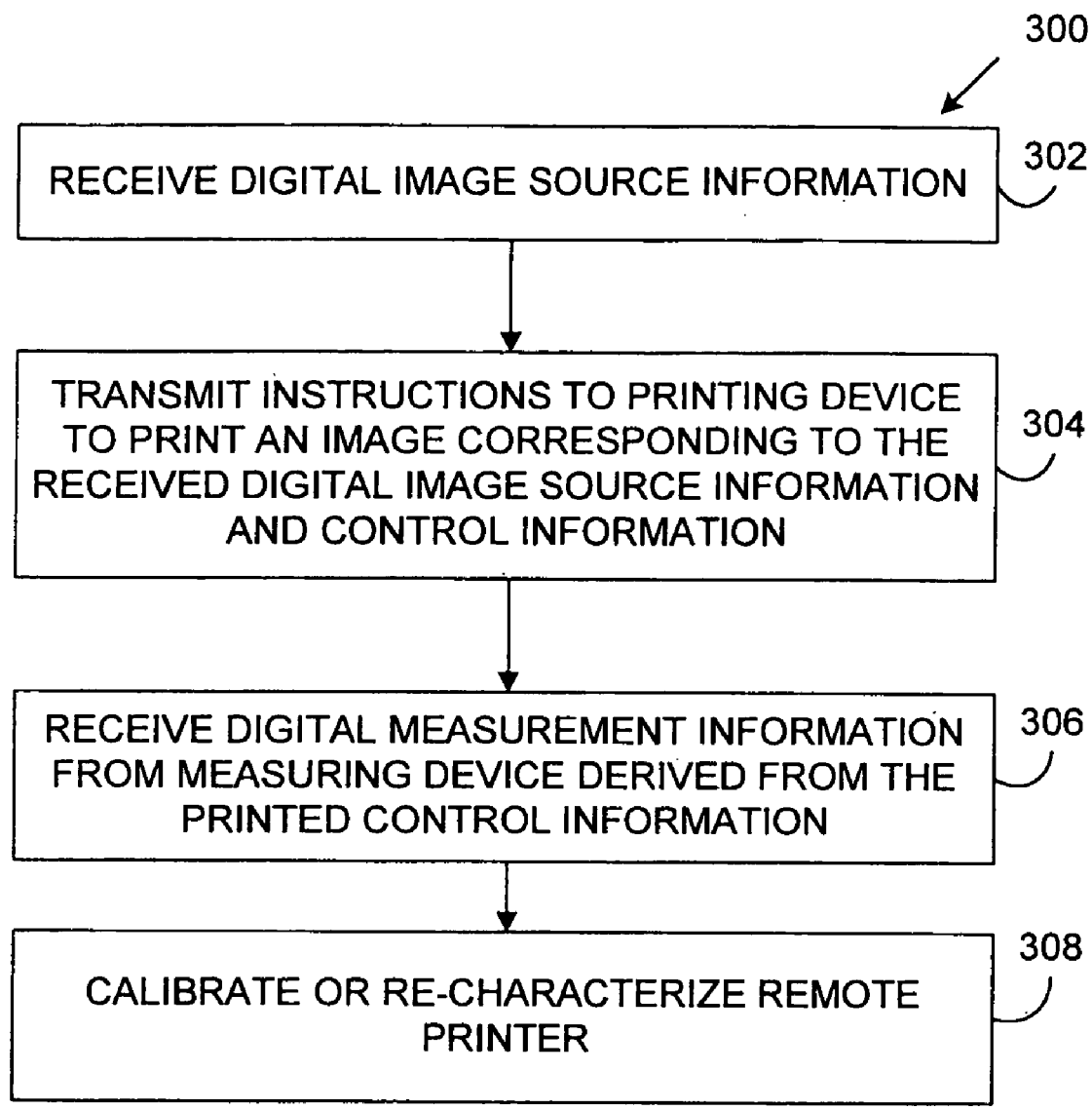

With respect to FIG. 8, a further embodiment 300 is described. The image is received at step 302, and printing instructions are generated at step 304. The printed control image is measured and the measurement information is received from the measureing device 60.

At step 308, the remote printer is calibrated using prior art calibration techniques to update the printer's characteristic function using the single-colorant data points obtained from the measured control information from one or more print jobs, or by measuring a subset of points in the color space that make up the LUT entries and interpolating the remaining LUT entries. The calibration data (measured information corresponding to the printed control image) may be obtained from a single print job, or over more than one print job. The calibration calculations may be performed by the image server 20, the remote computer 80, or the remote printing device 50. The remote printing system 10, 12, or 14, described above thus may be utilized to optimize the quality of color proofing or color printing systems.

A preferred embodiment of the present invention has been described herein. It is to be understood, of course, that changes and modifications may be made in the embodiment without departing from the true scope of the present invention, as defined by the appended claims. The present embodiment preferably includes logic to implement the described methods in software modules as a set of computer executable software instructions. The Computer Processing Unit ("CPU") or microprocessor implements the logic that controls the operation of the system. The microprocessor executes software that can be programmed by those of skill in the art to provide the described functionality.

The software can be represented as a sequence of binary bits maintained on a computer readable medium including magnetic disks, optical disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus may be used with or perform operations in accordance with the teachings described herein. The system may utilize wireless communication systems, and involve portable handheld devices.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry.

The claims should not be read as limited to the described order of elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. A remote printing system comprising:
   a computer including a memory, a processor, and a network port, wherein said computer receives first image information via said network port;
   a printing device connected to said computer for generating a printed image from said first image information; and
   a measuring device connected to said computer for generating second image information from said printed image;
   wherein said computer generates a quality measurement in response to said second image information, said quality measurement being indicative of a variation between said second image information and predetermined reference information by comparing said quality measurement to a threshold.

2. The remote printing system of claim 1 wherein said network port is a packet switched network port.

3. The remote printing system of claim 1 wherein said network port includes a protocol stack.

4. The remote printing system of claim 3 wherein said protocol stack is a TCP/IP stack.

5. The remote printing system of claim 1 wherein said network port is a circuit switched communication port.

6. The remote printing system of claim 1 wherein said measuring device is a spectrophotometer.

7. The remote printing system of claim 1 wherein said measuring device is a colorimeter.

8. The remote printing system of claim 1 wherein said quality measurement is used to generate a quality verification signal.

9. A system for remote printing comprising an image server computer adapted for connection to a remote printing station, said server computer having a memory, a processor, and a network port, wherein said image server computer is configured to perform the steps of:
   transmitting print job instructions including digital image source information over said network port for printing an image with a printing device at the remote printing station, said digital image source information including an associated control image comprising at least four spaced apart colors that incorporates identification information, the identification information being a sequence of colors selected from a set of predetermined colors wherein each predetermined color is predetermined with respect to a platform-independent color space;
   receiving digital image measurement information from the remote printing station corresponding to measurements of the control image; and
   identifying a print job associated with said digital image source information from said received digital image measurement information.

10. The system of claim 9 wherein the digital measurement information is used to generate calibration instructions to be sent to the remote printing station.

11. The system of claim 9 wherein each predetermined color is transferred to the color space of the printing device prior to printing.

12. A remote printing system, comprising:
   a network port;
   a printing device connected to said network port, wherein said printing device receives first image information from said network port and generates a printed image and a corresponding control image;
   a measuring device connected to said network port, wherein said measuring device generates second image information from said control image;
   an image server for generating print quality information from said second image information, said image server being located remotely from said printing device and said measuring device and adapted for communication with said printing device and said measuring device over a communication medium, said image server for transmitting said first image information to said printing device and said measuring device for transmitting said second image information to said image server;
   wherein the second image information is indicative of a variation between said second image information and predetermined reference information and the print quality information results from a comparison between the second image information and a threshold and wherein said second image information is used to calibrate said printing device.

13. A remote printing system, comprising:
   a network port;
   a printing device connected to said network port, wherein said printing device receives first image information from said network port and generates a printed image and a corresponding control image;
   a measuring device connected to said network port, wherein said measuring device generates second image information from said control image;
   a computer collocated with, and connected to said printing device, said measuring device, and said network port, wherein said computer relays said first image information to said printing device; and said measuring device transmits said second image information to said computer and said computer generates print quality information from said second image information wherein the second image information is indicative of a variation between said second image information and predetermined reference information and the print quality information results from a comparison between the second image information and a threshold and wherein said second image information is used to calibrate said printing device.

14. A remote printing system, comprising:

a network port;

a printing device connected to said network port, wherein said printing device receives first image information from said network port and generates a printed image and a corresponding control image, said control image comprising an arrangement of predetermined colors which predetermined colors provide identification information;

a measuring device connected to said network port, wherein said measuring device generates second image information from said control image;

wherein the second image information is indicative of a variation between said second image information and predetermined reference information and the second image information is compared to a threshold to generate print quality information and wherein said second image information is used to calibrate said printing device.

15. A method of ensuring print quality at a remote location comprising the steps of:

receiving digital image information from a communication medium;

printing an image corresponding to the received digital image information;

printing corresponding control information and generating a sequence of colors selected from a set of predetermined colors in response to a print job identification number;

generating digital control information from the printed control information; and, verifying print quality by comparing the digital control information to a digital reference, determining a variation between the digital control information and the digital reference and comparing the variation to a threshold.

16. The method of claim 15 wherein each predetermined color is predetermined with respect to a platform-independent color space.

17. The method of claim 16 wherein each predetermined color is transferred to the color space of a printing device prior to printing.

18. The method of claim 15 wherein each predetermined color is predetermined with respect to a color space of a printing device.

19. The method of claim 15 further comprising the step of generating identification information from the digital control information.

20. The method of claim 19 where the digital reference is a set of predetermined colorimetric values, and wherein the step of generating identification information includes the step of determining a sequence of colors from the digital control information with reference to the set of predetermined colors.

21. A system for remote printing comprising an image server computer adapted for connection to a remote printing station, said server computer having a memory, a processor, and a network port, wherein said image server computer is configured to perform the steps of:

transmitting digital image source information over said network port for printing an image at the remote printing station wherein the digital image source information includes identification information and wherein the identification information is a sequence of colors selected from a set of predetermined colors in response to a print job identification number;

receiving digital image measurement information from the remote printing station; and, verifying print quality by comparing the image measurement information to a digital reference, determining a variation between the image measurement information and the digital reference and comparing the variation to a threshold.

22. The system of claim 21 wherein each predetermined color is predetermined with respect to a platform-independent color space.

23. The system of claim 21 wherein each predetermined color is transferred to a color space of the printing station prior to printing.

24. The system of claim 21 wherein each predetermined color is predetermined with respect to a color space of the printing station.

25. A system for remote printing comprising an image server computer adapted for connection to a remote printing station, said server computer having a memory, a processor, and a network port, wherein said image server computer is configured to perform the steps of:

transmitting a fist set of print job instructions including first digital image source information over said network port for printing a main image at the remote printing station, said digital image source information including a first associated control image that incorporates identification information;

transmitting a second set of print job instructions including second digital image source information over said network port for printing the main image at the remote printing station, said digital image source information including a second associated control image that incorporates identification information and is different from the fist associated control image; and receiving first and second digital image measurement information from the remote printing station respectively corresponding to measurements of the first and second associated control images;

wherein said first and second received digital measurement information is used to separately identify the respective print job of the printed image.

26. The system of claim 25 wherein the digital measurement information is used to generate calibration instructions to be sent to the remote printing station.

27. The system of claim 25 wherein the identification information is a sequence of colors selected from a set of predetermined colors.

28. The system of claim 27 wherein each predetermined color is predetermined with respect to a color space of the printing station.

* * * * *